United States Patent Office 3,424,799
Patented Jan. 28, 1969

---

3,424,799
GENERAL SYNTHESIS OF DIKETOPHOSPHORANES AND ACETYLENIC KETONES
Pierre-Antoine Chopard and Robert J. G. Searle,, Geneva, Switzerland, assignors to American Cyanamid Company, Stamford, Conn., a corporation of Maine
No Drawing. Filed Apr. 1, 1966, Ser. No. 539,268
U.S. Cl. 260—590
Int. Cl. C07f 9/28
9 Claims

---

ABSTRACT OF THE DISCLOSURE

Novel diketo phosphoranes are disclosed having the formula

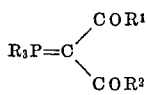

in which R is a hydrocarbon radical such as phenyl and $R^1$ and $R^2$ are the same or different typically being lower alkyl or phenyl. In addition, a process for preparing such diketo phosphoranes is disclosed in which a mono keto phosphorane is reacted with an anhydride of a monocarboxylic acid.

A process for preparing acetylenic ketones is also disclosed in which the diketo phosphoranes described above are pyrolized.

---

This invention relates to new diketo phosphoranes, to a process of making these compounds and using them to synthesize acetylenic ketones.

Prior processes for the production of acetylenic ketones have involved cumbersome syntheses from metallic acetylides with multiple steps and poor yields. One of the aspects of the present invention involves a process of making a new class of phosphoranes, namely diketo phosphoranes, and especially triphenyl diketo phosphoranes. These new compounds are covered by the present invention as new chemical compounds and have other uses as intermediates for organic syntheses, the pyrolysis to acetylenic ketones being only one use, but at the moment one of the most important. The present invention also includes a new process for producing the diketo phosphoranes.

Monoketo phosphoranes are known having the general formula $R_3P=CH-COR^2$, in which R and $R^2$ are hydrocarbon radicals of the acyclic, carbocyclic or carbocyclic acyclic series. Typical examples are those having the formula $Ph_3P=CH-COCH_3$ and

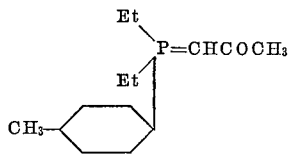

There are also known triphenyl phosphoranes which have an acyl and a carboxylic acid or carbalkoxy group, which have the formula

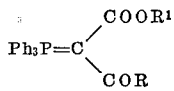

where R has the same meaning as above and $R^1$ is hydrogen or alkyl.

We have found that when monoacyl phosphoranes of the formula $R_3P=CH-COR^2$ in which R and $R^2$ have the same meaning as above are reacted with a monocarboxylic acid anhydride, diketo phosphoranes of the formula

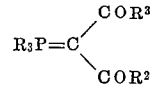

R, $R^2$=alkyl or aryl are produced. R, $R^2$ and $R^3$ depend on the monoketo phosphorane used, and the monocarboxylic acid anhydride employed at least one R is phenyl or substituted phenyl.

The diketo phosphoranes on pyrolysis split off a $R_3PO$ group, leaving an acetylenic ketone having a number of carbon atoms corresponding to the two acyl groups and to the methylene carbon of the phosphorane. Yields of the acetylenic ketones are very high, and the process is therefore very economical. The purity of the acetylenic ketone is also excellent, which is a further advantage of this phase of the present invention.

It is a further advantage of the phase of the present invention dealing with the processes of producing the new diketo phosphoranes that the reaction conditions are not critical and the reaction proceeds at moderate temperature. It is usually desirable to carry out the reaction in a suitable inert solvent, such as chloroform. This is merely typical, and any other inert solvents may be used.

The invention will be described in greater detail in conjunction with the following specific examples.

Example 1

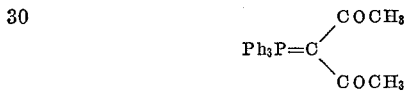

A mixture of 0.03 mole of α-acetylmethylenetriphenylphosphorane and 0.3 mole acetic anhydride in 10–20 ml. of dry chloroform was stirred at 60° C. for 2–8 hours until the reaction was substantially complete. A dark solution resulted which was evaporated at 80° C. under 12 mm. pressure to give a sticky glue-like residue which was triturated with ether, filtered, and the precipitate recrystallized from an ethyl acetate-ether or ethyl acetate-petroleum ether mixture. An 83% yield of αα-diacetylmethylenetriphenylphosphorane.

Example 2

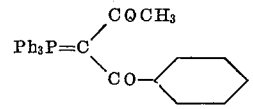

The process of Example 1 was repeated, replacing the acetylmethylenetriphenylphosphorane with benzoylmethylenetriphenylphosphorane. A 97% yield of α-acetyl-α-benzoylmethylenetriphenylphosphorane was obtained.

Example 3

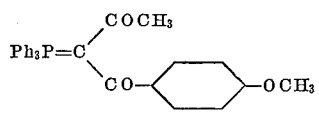

The procedure of Example 1 was repeated, replacing the acetylmethylenetriphenylphosphorane with p-methoxybenzoylmethylenetriphenylphosphorane. A 96% yield of α-acetyl - α - p - methoxybenzoylmethylenetriphenylphosphorane was obtained.

Example 4

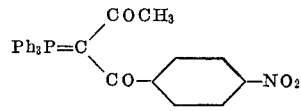

The procedure of Example 1 was repeated, replacing the acetylmethylenetriphenylphosphorane with p-nitrobenzoylmethylenetriphenylphosphorane. Chloroform was also replaced with dry tetrahydrofuran, and the heating was continued for 4 days. A 42% yield of α-acetyl-α-p-nitrobenzoylmethylenetriphenylphosphorane was obtained.

Example 5

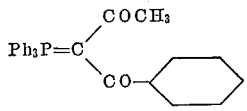

The procedure of Example 1 was followed, replacing the acetic anhydride with benzoic anhydride and refluxing for from 3–5 hours. The resulting solid was extracted several times with petroleum ether in order to remove the excess benzoic anhydride, and then ether was added to produce a crude product in the yield of 67%. The product was the same as in Example 2.

Example 6

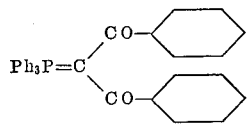

The procedure of Example 5 was repeated, replacing the α-acetylmethylenetriphenylphosphorane with the corresponding benzoylmethylenetriphenylphosphorane. An 89% yield of αα-dibenzoylmethylenetriphenylphosphorane was obtained, and this was recrystallized from an ethyl acetate-petroleum ether mixture, as described in Example 1.

Example 7

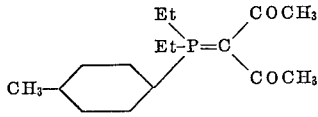

The procedure of Example 1 is repeated replacing the α-acetylmethylenetriphenylphosphorane with an equivalent amount of α-acetylmethylenediethyl-p-tolylphosphorane. A gool yield of the corresponding diketo phosphorane is obtained Example 8

A number of the diketo phosphoranes of the preceding examples were pyrolyzed by heating to 250–280° C. at 0.01 mm. for one hour, colecting the distillates in a liquid-air cooled receiver. The following table shows the products:

PYROLYSIS OF DIKETOPHOSPHORANES

| Example No. | Diketo Phosphorane | Product |
|---|---|---|
| 1 | $Ph_3P=C(COMe)_2$ | $MeC \equiv CCOMe$ |
| 2 | 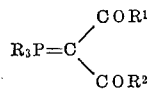 | $PhC \equiv C.COMe$ |
| | | $MeC \equiv C.COPh$ |
| 6 | $Ph_3P=C(COPh)_2$ | $PhC \equiv CCOPh$ |

It will be noted that on pyrolysis of the diketo phosphorane from Example 2 a mixture of the two isomeric acetylenic ketones was produced.

We claim:
1. Diketo phosphoranes having the following formula

$$R_3P=C\begin{matrix}COR^1\\COR^2\end{matrix}$$

in which R is a hydrocarbon radical selected from the group consisting of lower alkyl, phenyl and substituted phenyl and mixtures thereof wherein at least one R is phenyl or substituted phenyl and $R^1$ and $R^2$ are the same or different acyclic, carbocylic or carbocylic acyclic radicals linked to the carbon atom of the carbonyl groups by carbon to carbon bonding and selected from the group consisting of lower alkyl, phenyl and substituted phenyl.

2. Diketo phosphoranes according to claim 1 in which R is phenyl.

3. Diketo phosphoranes according to claim 2 in which $R^1$ and $R^2$ are methyl.

4. Kiketo phosphoranes according to claim 2 in which $R^1$ is methyl and $R^2$ is phenyl.

5. Diketo phosphoranes according to claim 2 in which $R^1$ is methyl and $R^2$ is p-methoxyphenyl.

6. Diketo phosphoranes according to claim 2 in which $R^1$ is methyl and $R^2$ is p-nitrophenyl.

7. Dikto phosphoranes according to claim 2 in which both $R^1$ and $R^2$ are phenyl.

8. A process of preparing a diketo phosphorane according to claim 1, comprising reacting a monoketo phosphorane having the formula $R_3P=CHCOR^1$ with an anhydride of a monocarboxylic acid, having the formula $(R^2CO)_2O$.

9. A process according to claim 8 in which R is phenyl.

References Cited

Gough et al., J. Cham. Soc. 1962, 2333–2334 Chopard et al., J. Org. Chem. 30, 1015–1019 (April 1965).

DANIEL D. HORWITZ, Primary Examiner.

U.S. Cl. X.R.

260—593